United States Patent
Eguchi

(10) Patent No.: US 8,082,048 B2
(45) Date of Patent: Dec. 20, 2011

(54) POSITION CONTROLLING DEVICE

(75) Inventor: Satoshi Eguchi, Aichi (JP)

(73) Assignee: Okuma Corporation, Aichi (JP)

( * ) Notice: Subject to any disclaimer, the term of this patent is extended or adjusted under 35 U.S.C. 154(b) by 456 days.

(21) Appl. No.: 12/247,771

(22) Filed: Oct. 8, 2008

(65) Prior Publication Data
US 2009/0112376 A1    Apr. 30, 2009

(30) Foreign Application Priority Data

Oct. 9, 2007   (JP) ................................ 2007-262961
Jan. 24, 2008  (JP) ................................ 2008-013266

(51) Int. Cl.
*G05B 11/32*   (2006.01)
*G05B 11/02*   (2006.01)
*G05D 1/02*    (2006.01)

(52) U.S. Cl. ........... 700/70; 318/560; 318/567; 700/302
(58) Field of Classification Search ............ 700/70, 700/56–66; 318/560, 567
See application file for complete search history.

(56) References Cited

U.S. PATENT DOCUMENTS

| | | | | |
|---|---|---|---|---|
| 5,432,422 A | * | 7/1995 | Nagano et al. | 318/611 |
| 6,184,644 B1 | * | 2/2001 | Eguchi | 318/632 |
| 6,725,129 B2 | * | 4/2004 | Kito | 700/280 |
| 6,861,816 B2 | * | 3/2005 | Eguchi | 318/632 |
| 7,366,576 B2 | * | 4/2008 | Tanahashi et al. | 700/61 |
| 2003/0201746 A1 | * | 10/2003 | Eguchi | 318/567 |
| 2005/0033460 A1 | * | 2/2005 | Tanahashi et al. | 700/61 |

FOREIGN PATENT DOCUMENTS

| | | | |
|---|---|---|---|
| JP | 2007-25961 | | 2/2007 |
| JP | 2007025961 | * | 2/2007 |

OTHER PUBLICATIONS

A. Yamamoto et al. "High-Speed Positioning Control for Linear Motor Driving Table Without Base Vibration"; The Japan Society for Precision Engineering, vol. 70, No. 5, 2004; pp. 645-650 (11 pages).*
esp@cenet patent abstract for Japanese Publication No. 2007025961, Publication date Feb. 1, 2007 (1 page).

* cited by examiner

*Primary Examiner* — Kakali Chaki
*Assistant Examiner* — Sivalingam Sivanesan
(74) *Attorney, Agent, or Firm* — Osha • Liang LLP

(57) ABSTRACT

A structure is provided in which a thrust feed forward structure for operating a structure to be driven without vibration and a control structure which simultaneously compensates for positional deviation caused by the thrust feed forward structure and positional deviation caused by a base displacement are included in a position controlling device (3). Alternatively, a structure is provided in which an acceleration and deceleration process for realizing response of the position of the structure to be driven and base displacement without vibration and a control structure which determines a feed forward amount with respect to a position instruction value after the acceleration and deceleration process are provided to the position controlling device.

4 Claims, 18 Drawing Sheets

POSITION CONTROLLING DEVICE

CROSS-REFERENCE TO RELATED APPLICATIONS

This application claims priority to Japanese Patent Applications No. 2007-262961 filed on Oct. 9, 2007 and No. 2008-013266 filed on Jan. 24, 2008, which are incorporated herein by reference in their entirety.

BACKGROUND OF THE INVENTION

1. Field of the Invention

The present invention relates to a position controlling device which is used for shaft control of a numerical control machine.

2. Description of the Related Art

Conventionally, controlling devices are used in which a driving system for accelerating and decelerating a structure to be driven is supported by and fixed to a base of the device, and displacement force acting on the base is compensated for by a reaction force of the structure to be driven. FIG. 11 is a model of a driving system schematically showing a mechanism of one shaft of the driving system in a machine tool, which is one type of machine which employs numerical control. The driving system has a structure in which a driving force Fx is imparted to a structure C to be driven by a servo motor (not shown) which moves on a structure B, which also functions as a guiding surface, in a direction $x_2$. Structures A placed on both sides of the structure B support and fix the structure B, and one side of each structure A is rigidly mounted on and fixed to the ground. When the structure C to be driven is accelerated or decelerated in the $x_2$ direction, the structure A which is the base receives the reaction force from the structure C to be driven, deforms in a direction $x_1$, and generates vibration. On the structure B, a linear scale (not shown) for detecting the position $x_2$ of the structure to be driven is provided.

Next, equations of motion are determined assuming the driving system model of FIG. 11 as a target plant. In this case, as the generalized coordinate system, the position $x_2$ of the structure to be driven and the displacement $x_1$ of the base may be used, and the following two equations of motion can be obtained:

$$(Mb+Mc)\cdot d^2x_1/dt^2 = Mc\cdot d^2x_2/dt^2 + Ra\cdot x_1 = 0 \qquad (1)$$

$$Mc\{d^2x_2/dt^2 - d^2x_1/dt^2\} = Fx \qquad (2)$$

wherein Mb represents a mass Mb of the structure B, Mc represents a mass Mc of the structure C to be driven, and Ra represents a directional rigidity Ra of the structure A in the direction of $x_1$.

FIG. 12 is a block diagram showing the equations of motion (1) and (2) for the target plant, and will be described in detail in the description of the preferred embodiments of the present invention to be described later.

FIG. 13 is a block diagram of a position controlling device of a related art. A position instruction value X which is generated by an upper device (not shown) employing a function is input to an acceleration and deceleration processor 50. For a position instruction value Xc output by the acceleration and deceleration processor 50, a second-order functional acceleration and deceleration process is applied in the acceleration and deceleration processor 50 so that the second order derivative with respect to time of dXc/dt is bounded even when the derivative of X with respect to time, dX/dt is step-shaped. In order to accelerate a position instruction response, the position instruction value Xc is differentiated with respect to time in differentiators 54 and 55 (S is a Laplacian operator), to calculate feed forward amounts Vf and Af of the instruction velocity and the instruction acceleration. A conversion block Cb is a conversion block for determining a feed forward amount of thrust which corresponds to the motor thrust for generating the acceleration Af, and is usually substituted by multiplying the mass Mc of the structure C to be driven to the acceleration Af.

As the position detection value of the target plant 58, the position $x_2$ of the structure to be driven, which is detected by the above-described linear scale is used. The position $x_2$ of the structure to be driven is subtracted from the position instruction value Xc by a subtractor 51, and a position deviation output by the subtractor 51 is amplified by a factor of Gp by a position deviation amplifier Gp, and the velocity feed forward amount Vf is added to the output of the position deviation amplifier Gp in an adder 52, to obtain a velocity instruction value V. A subtractor 53 subtracts, from the velocity instruction value V, a velocity v of the structure to be driven which is obtained by differentiating the position $x_2$ of the structure to be driven with respect to time by a differentiator 56, and the output of the subtractor 53 which is a velocity deviation is amplified by a velocity deviation amplifier Gv. The velocity deviation amplifier Gv generally comprises a proportional integration amplifier and various filters for inhibiting high-frequency vibration phenomena generated in the order of hundred Hz of the target plant. The output of the velocity deviation amplifier Gv and the velocity feed forward amount Vf are added by an adder 57, and an output of the adder becomes the motor generated thrust, that is, the driving force Fx of the structure C to be driven.

FIG. 14 shows a result of a simulation of a second-order functional acceleration response (maximum acceleration 2 [m/sec$^2$]) of the position controlling device of the related art of FIG. 13, when the target plant parameters are set to Mb=500 [Kg], Mc=300 [Kg], and Ra=19.6·10$^6$ [Nm/m], and the amplifications Gp and Gv which are control parameters are preferably adjusted. The position controlling device 200 in this case attempts to control the absolute position ($x_2-x_1$) of the structure to be driven of the target plant according to the position instruction value Xc, as shown in FIG. 11. However, because the position controlling device 200 of FIG. 13 does not consider the displacement $x_1$ of the base, a large error in absolute position εo=Xc-($x_2-x_1$) is caused during acceleration as shown in FIG. 14.

FIG. 15 is a block diagram showing another example structure of a position controlling device of a related art. This device has a structure in which a compensation block for the displacement of base $x_1$ shown in JP 2007-025961 A is added. A structure of the added portion will now be described.

A base vibration monitor correspondent block 59 of FIG. 15 is a block corresponding to a base vibration monitor of JP2007-025961 A. Because there is no dumping component in the base vibration, the operation of this block according to JP 2007-025961 A which is Xsw=McS$^2$/(MbS$^2$+Ra)Xc becomes a unstable transfer function, and, thus, Xsw=(McS$^2$/Ra)Xc is employed in the exemplified structure, placing more importance on the operation under constant acceleration. Here, Xsw represents an instruction value for base vibration compensation. An adder 60 adds the position instruction value Xc to the base vibration compensation instruction value Xsw, resulting in a position instruction value Xco for control. The base vibration compensation instruction value Xsw is also differentiated with respect to time by differentiators 61 and 63 so that a velocity instruction value Vsw for base vibration compensation and an acceleration instruction value Asw for base vibration compensation are calculated. The velocity instruction value Vsw is added to the velocity feed forward amount Vf in an adder 62, and the acceleration instruction value Asw is multiplied by the mass Mc of the structure to be driven and results in a thrust instruction value Fsw for base vibration compensation, which is in turn added with thrust feed forward amount Ff in an adder 64.

FIG. 16 shows a result of a simulation of a response when target plant parameters, control parameters, and a second-order functional acceleration process similar to FIG. 14 are applied on the position controlling device of related art of FIG. 15. Because a control structure which compensates the base displacement is employed, the error $\epsilon o$ of the absolute position is reduced. However, because there is no dumping component, the response has a remaining vibration at the start and end of acceleration generated by an acceleration derivative instruction value Bc ($=d^3Xc/dt^3$), with the vibration being enlarged as the instruction value Bc is increased.

FIG. 17 is a block diagram of another example structure of a position controlling device of related art. In this example structure, the technique described by Akihiro YAMAMOTO (and four others) in "High-Speed Positioning Control for Linear Motor Driving Table without Base Vibration", Journal of the Japan Society for Precision Engineering, Supplement Contributed Papers, Japan Society for Precision Engineering, 2004, Vol. 70, No. 5, p. 645-650 is used. The thrust feed forward is realized using an inverse transfer function of the target plant and the vibration of the base is inhibited. Next, portions which differ from the position controlling devices of the related art which are already described will be described.

A transfer function $P_2$ indicates a transfer function from the driving force Fx to the position $x_2$ of the structure to be driven, and is given by the following Equation 3 based on FIG. 12.

$$P_2 = \{(Mb+Mc)S^2+Ra\}/\{McS^2(MbS^2+Ra)\} \quad (3)$$

Here, because the inverse transfer function $P_2^{-1}$ of the transfer function $P_2$ is not stable, a transfer function F represented by the following Equation 4 is considered in order to set $P_2^{-1} \cdot F$ which has a stable pole ($S=-\omega o$) of a first-order delay component.

$$F = \{\omega o/(S+\omega o)\}\{(Mb+Mc)S^2+Ra\}/Ra \quad (4)$$

Thus, $P_2^{-1} \cdot F$ is:

$$P_2^{-1} \cdot F = \{\omega o McS^2(MbS^2+Ra)\}/\{(S+\omega o)Ra\} \quad (5)$$

A feed forward amount Ff of thrust is calculated with $Ff=P_2^{-1} \cdot F \cdot Xc$, and the thrust feed forward amount Ff in FIG. 11 can be calculated because a third-order derivative of the position instruction value Xc with respect time is bounded.

FIG. 18 shows a result of a simulation of a response when target plant parameters, control parameters, and a second-order functional acceleration process similar to FIG. 14 are applied to the position controlling device of related art of FIG. 17 with the parameter $\omega o=10000$. Fundamentally, because a structure is employed in which the position $x_2$ of the structure to driven matches the position instruction value Xco for control, inhibition of the vibration of the response is achieved. However, when velocity instruction value Vc is not zero (Vc≠0), an error in absolute position $\epsilon o$ remains during shaft operation due to occurrence of a position instruction deviation $\epsilon c=Xc-Xco$.

SUMMARY OF THE INVENTION

As described, in the position controlling devices of the related art, it has not been possible to accurately control the position of the structure to be driven in consideration of both vibration caused by rigidity of the base on which the structure to be driven is supported and fixed and generation of the displacement of the base. An advantage of the present invention is that a position controlling device is provided in which vibration of a structure to be driven can be inhibited, even during acceleration and deceleration, and error of the position of the structure to be driven with respect to the position instruction can be reduced. Another advantage realized by the present invention is that a position controlling device is provided which realizes prevention of induced vibration of various parts of a device and inhibition of vibration during change of a device parameter.

The present invention achieves the above-described advantages by adding, to a position controlling device, a thrust feed forward structure for operating the structure to be driven with no vibration and a control structure which simultaneously compensates a position deviation caused by the thrust feed forward structure and the position deviation caused by the displacement of the base.

According to one aspect of the present invention, there is provided a position controlling device in which a driving system which applies acceleration and deceleration operations to a structure to be driven is supported by and fixed on a base and compensation for a force displacement caused in the base is provided by a reaction force of the structure to be driven and which controls an absolute position of the structure to be driven by detecting a position of the structure to be driven which is driven by a servo motor and calculating a position instruction value after compensation according to a position instruction value from an upper device, the position controlling device comprising an acceleration and deceleration processor which receives as an input the position instruction value and outputs a position instruction value after acceleration and deceleration process wherein a third-order derivative with respect to time of the output position instruction value is bounded, an adjustment transfer function block which receive as an input the position instruction value after compensation and outputs a position instruction value for control, a block which calculates a thrust feed forward based on the position instruction value after compensation and adds the thrust feed forward to a driving force of the servo motor, a block which calculates a position deviation compensation amount which compensates for a position instruction deviation and a base displacement due to the adjustment transfer function based on a derivative with respect to time of the position instruction value after the acceleration and deceleration process, and a block which subtracts the position deviation compensation amount from the position instruction value after acceleration and deceleration process, to obtain the position instruction value after compensation.

According to another aspect of the present invention, it is preferable that, in the position controlling device, the position deviation compensation amount is calculated as an amount of compensation of position instruction deviation due to the adjustment transfer function.

According to another aspect of the present invention, there is provided a position controlling device in which a driving system which applies acceleration and deceleration operations to a structure to be driven is supported by and fixed on a base and compensation for a force displacement caused in the base is provided by a reaction force of the structure to be driven and which controls an absolute position of the structure to be driven according to a position instruction value from an upper device by detecting a position of the structure to be driven which is driven by a servo motor, the position controlling device comprising an acceleration and deceleration processor which receives as an input the position instruction value and outputs a position instruction value after acceleration and deceleration process wherein a second-order derivative with respect to time of the output position instruction value is bounded, a block which has a notch filter representing, as a transfer function, a relationship between a driving force which is output by the servo motor and a driving position obtained by the driving force and having a transfer pole of the transfer function as a notch angle frequency, and which outputs, as a position instruction value for control, the position instruction value after acceleration and deceleration process which is output from the acceleration and deceleration processor, a block which calculates a thrust feed forward amount which causes the absolute position of the structure to be driven to correspond to the position instruction value for control, a block which calculates a base displacement based on the position instruction value for control and adds the base displacement to the position instruction value for control, to calculate a position instruction value corresponding to the position of the structure to be driven, and a block which differentiates, with respect to time, the position instruction value corresponding to the position of the structure to be driven, to calculate a velocity feed forward amount.

According to another aspect of the present invention, it is preferable that, in the position controlling device, the block which outputs, as the position instruction value for control, the position instruction value after acceleration and deceleration process which is output from the acceleration and deceleration processor has a notch filter representing, as a transfer function, a relationship between the driving force which is output by the servo motor and the driving position obtained by the driving force and having a transfer zero point of the transfer function as the notch angle frequency, and outputs, as the position instruction value for control, the position instruction value after acceleration and deceleration process which is output from the acceleration and deceleration processor.

According to the position controlling device of various aspects of the present invention, by including a thrust feed-forward structure which controls the structure to be driven according to the position instruction value for control and a position deviation compensation structure which simultaneously and precisely compensates a position instruction deviation caused by introduction of the thrust feed forward structure and a position deviation caused by the base displacement, it is possible to inhibit generated vibration and cause the absolute position $(x_2-x_1)$ of the structure to be driven of the target plant to precisely follow the position instruction value Xc during a shaft operation including acceleration and deceleration. In addition, because the amount of control can be preferably varied according to the size of the acceleration instruction value Ac and the acceleration derivative instruction value Bc, a high control advantage can be obtained regardless of the size of these instruction values.

In addition, the position controlling device of various aspects of the present invention comprises a feed forward structure of thrust and velocity for controlling the structure to be driven according to the position instruction value and calculates the position instruction value for control by applying acceleration and deceleration processes of a notch filter structure which has a small introduction impact on the position instruction value. With this structure, the vibrations in various feed forward amounts are removed, and the responses of the position of the structure to be driven and the base displacement can be controlled without vibration and with a high precision. Furthermore, because vibration in the responses of the position of the structure to be driven and the base displacement is cancelled, no vibration is induced in the various parts of the device, and highly advantageous vibration inhibition can be maintained even when the device parameters are changed.

BRIEF DESCRIPTION OF THE DRAWINGS

Preferred embodiments of the present invention will be described in detail by reference to the drawings, wherein.

DESCRIPTION OF THE PREFERRED EMBODIMENTS

Preferred embodiments of the present invention (hereinafter also referred to as "embodiments") will now be described. A characteristic of the present embodiment is that an adjustment transfer function M(s) is used to inhibit vibrations with a thrust feed forward $Ff=P_2^{-1}M \cdot Xc$. Fundamentally, because the position $x_2$ of the structure to be driven matches the position instruction value for control, $Xco=M \cdot Xc$, the position $x_2$ does not match $Xc$. Therefore, a position instruction value after compensation $Xc^*$ is introduced to set $Xco=M \cdot Xc^*$, and $Ff=P_2^{-1}M \cdot Xc^*$ is determined. Moreover, a form is employed which has a position deviation compensation structure which simultaneously compensates the deviation ($Xc^*-Xco$) on the position instruction caused by $M(s)$ and a position deviation by the base displacement $x_1$.

Control is considered in which the absolute position ($x_2-x_1$) of the structure to be driven of the target plant is controlled according to the position instruction value $Xc$. When restrictions for achieving both the vibration inhibition and position deviation compensation are considered, the following restrictions (a)-(c) can be obtained.

(Restriction a): The adjustment transfer function $M(s)$ is necessary and can be represented with the following equation (6) using a stable polynomial expression $Go(s)$.

$$M=\{(Mb+Mc)S^2+Ra\}/Go \quad (6)$$

(Restriction b): Thrust feed forward $Ff$ of equation (7) can be calculated.

$$Ff=P_2^{-1}M \cdot Xc^*=(\{McS^2(MbS^2+Ra)\}/Go)Xc^* \quad (7)$$

Figure 12:
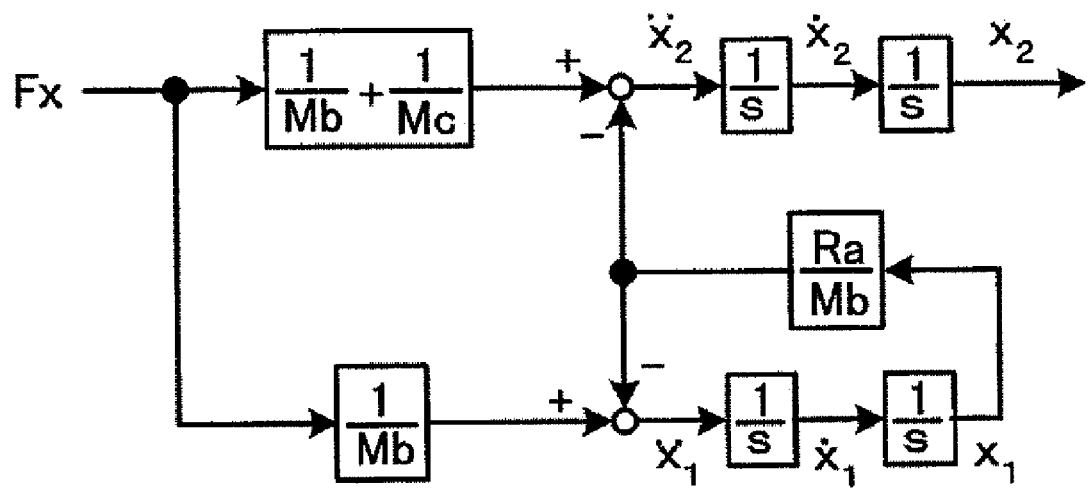
FIG. 12 is a block diagram describing a movement of a target plant of FIG. 11.
Figure 13:
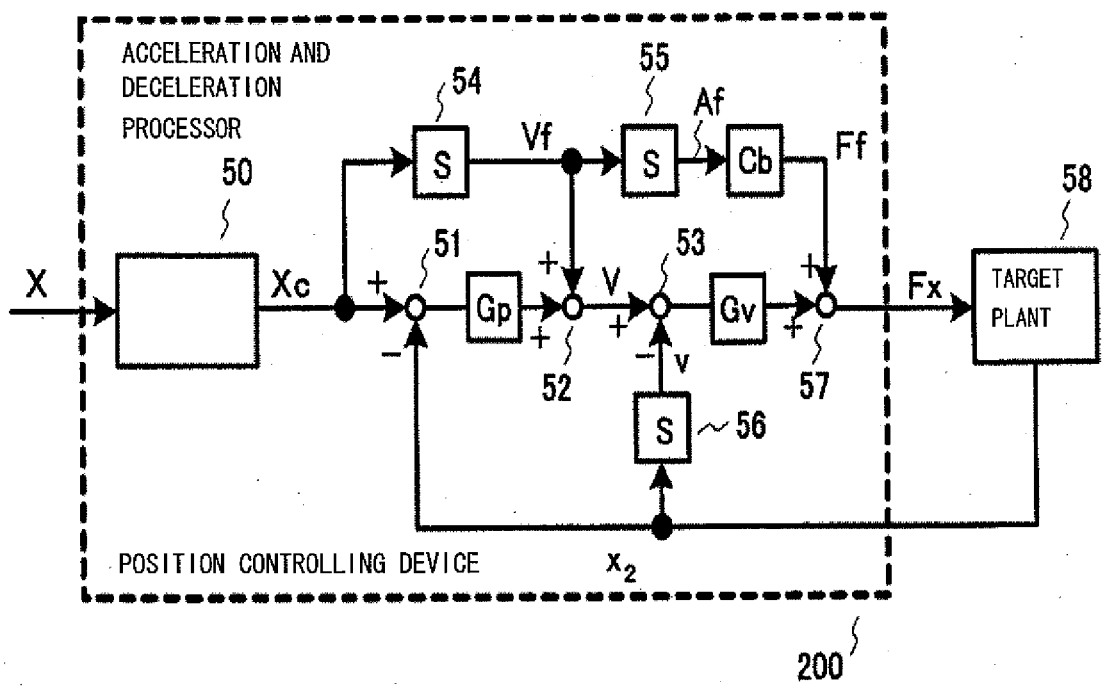
FIG. 13 is a block diagram showing a first example structure of a position controlling device of related art.

Here, because $x_2=Xco=M \cdot Xc^*=(\{(Mb+Mc)S^2+Ra\}/Go)Xc^*$, and, based on FIG. 12, $x_1/x_2=McS^2/\{(Mb+Mc)S^2+Ra\}$, $x_1=(McS^2/Go)Xc^*$. Thus, the absolute position ($x_2-x_1$) of the structure to be driven can be represented by the following Equation 8.

$$x_2-x_1=\{(MbS^2+Ra)/Go\}Xc^* \quad (8)$$

Thus, a position deviation compensation structure is considered which defines the position deviation compensation amount as $\alpha(Xc)$, a function of the original position instruction value $Xc$, and a relationship between $Xc$ and $Xc^*$ as $Xc^*=Xc-\alpha(Xc)$. In this case, the restriction of the position deviation compensation becomes:

$$Xc-(x_2-x_1) = \{Xc-Xc^*\}+\{Xc^*-(x_2-x_1)\} \quad (9)$$
$$= \alpha(Xc)+\{(Go-MbS^2-Ra)/Go\}Xc^*$$
$$= \alpha(Xc)+\{(Go-MbS^2-Ra)/Go\}\{Xc-\alpha(Xc)\}$$
$$= 0$$

If Equation 9 is solved for $\alpha(Xc)$, the following restriction can be obtained.

(Restriction c): The position deviation compensation amount $\alpha(Xc)$ satisfies Equation 10.

$$\alpha(Xc)=\{(MbS^2+Ra-Go)/(MbS^2+Ra)\}Xc \quad (10)$$

Of these restrictions, the restriction (c) cannot be strictly satisfied because Equation 10 is not a stable rational function, but $Go(s)$ and $\alpha(Xc)$ are determined with the following Equation 11 using an approximation form which can be implemented:

$$Go(s)=Ra$$
$$\alpha(Xc)=(S^2/\{S^2+\beta S+(Ra/Mb)\})Xc \quad (11)$$

wherein $\beta$ is an arbitrary parameter of a positive real number. When $\beta$ is set to reach 0 ($\beta \to 0$), the approximation as the position deviation compensation is improved, but the position deviation compensation amount $\alpha(Xc)$ becomes more vibrating.

$M$, $P_2^{-1}M$, and $Xc^*$ can be determined, based on Equations 6, 7, etc.:

$$M=\{(Mb+Mc)S^2+Ra\}/Ra \quad (12)$$

$$P_2^{-1}M=\{McS^2(MbS^2+Ra)\}/Ra \quad (13)$$

$$Xc^*=Xc-(S^2/\{S^2+\beta S+(Ra/Mb)\})Xc \quad (14)$$

Figure 1:
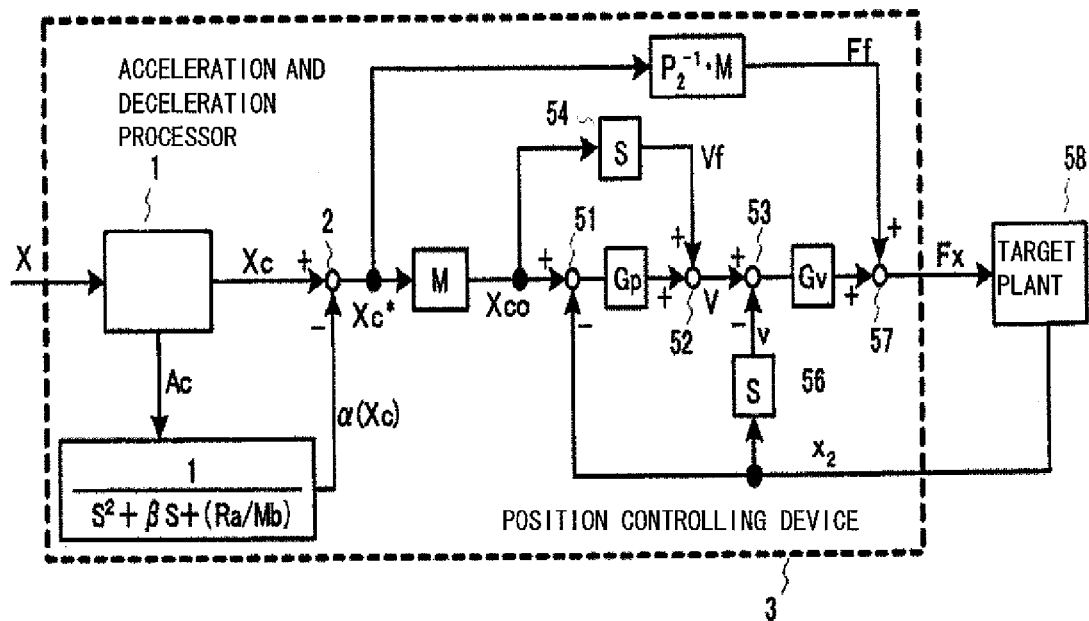
FIG. 1 is a block diagram showing a structure of a first preferred embodiment of a position controlling device according to the present invention.

FIG. 1 is a block diagram of a position controlling device according to the present embodiment. Portions which differ from the position controlling device of the related art described above will now be described. A position deviation compensation amount $\alpha(Xc)$ is determined with an input of an acceleration instruction value $Ac$ ($=d^2Xc/dt^2$), based on Equation 11. Based on the above description, the position instruction value $Xc^*$ after compensation is calculated by subtracting the position deviation compensation amount $\alpha(Xc)$ from the position instruction value $Xc$ at a subtractor 2. The position instruction value $Xco$ for control is determined, based on the above description, by $Xco=M \cdot Xc^*$. In addition, the thrust feed forward $Ff$ is determined as $Ff=P_2^{-1}M \cdot Xc^*$.

The actual calculations of various parameters are given by the following Equations 15, 16, and 17:

$$Ff = P_2^{-1}M \cdot Xc^* \quad (15)$$
$$= (\{McS^2(MbS^2+Ra)\}/Ra)(Xc-[S^2/\{S^2+\beta S+(Ra/Mb)\}]Xc)$$
$$= McAc+\{McMb\beta S^2/(Ra\{S^2+\beta S+(Ra/Mb)\})\}Bc$$

$$Xco = M \cdot Xc^* \quad (16)$$
$$= (\{(Mb+Mc)S^2+Ra\}/Ra)(Xc-(S^2/\{S^2+\beta S+(Ra/Mb)\})Xc)$$
$$= Xc+[\{(Mb+Mc)\beta S+(McRa/Mb)\}/(Ra\{S^2+\beta S+(Ra/Mb)\})]Ac$$

$$Vf = dXco/dt \quad (17)$$
$$= Vc+[\{(Mb+Mc)\beta S+(McRa/Mb)\}/Ra\{S^2+\beta S+(Ra/Mb)\})]Bc$$

wherein $Bc=d^3Xc/dt^3$.

Therefore, an acceleration and deceleration processor 1 is a processor which applies a second-order functional acceleration and deceleration process to the position instruction value $X$ so that $Bc=d^3Xc/dt^3$ which is a second-order derivative with respect to time of the velocity instruction value $Vc=dXc/dt$ is bounded, and outputs the position instruction value $Xc$.

Figure 2:
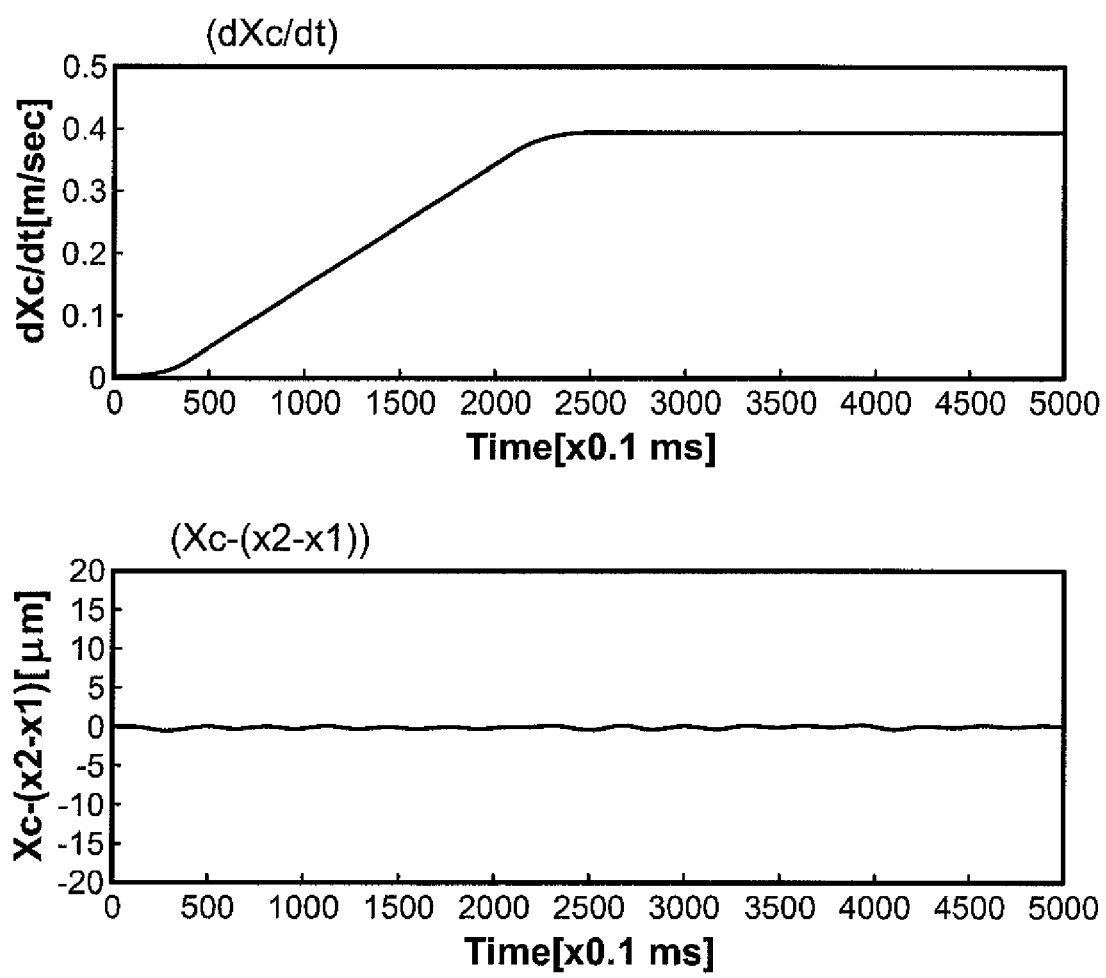
FIG. 2 is an explanatory diagram of an acceleration response of a target plant provided by a position controlling device as illustrated in FIG. 1.
Figure 14:
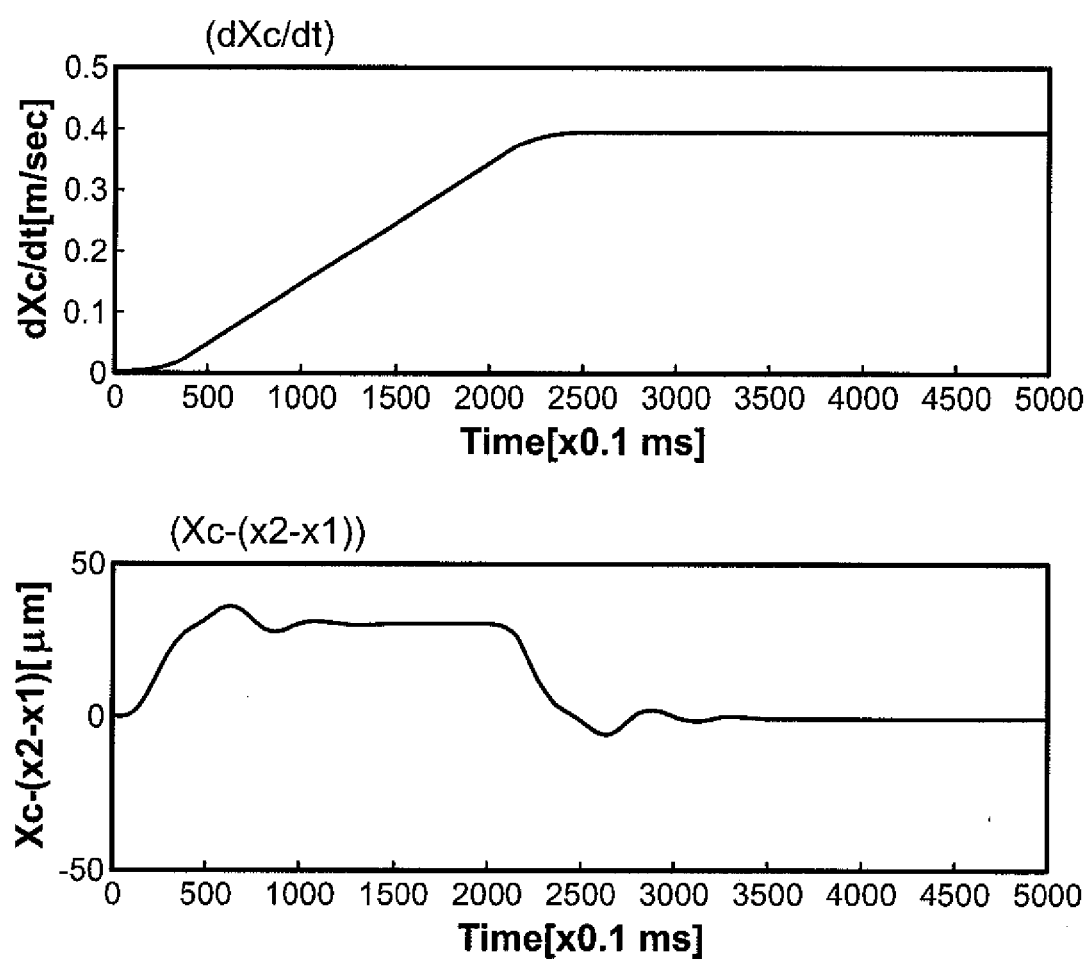
FIG. 14 is an explanatory diagram of an acceleration response of a target plant provided by a position controlling device as illustrated in FIG. 13.
Figure 15:
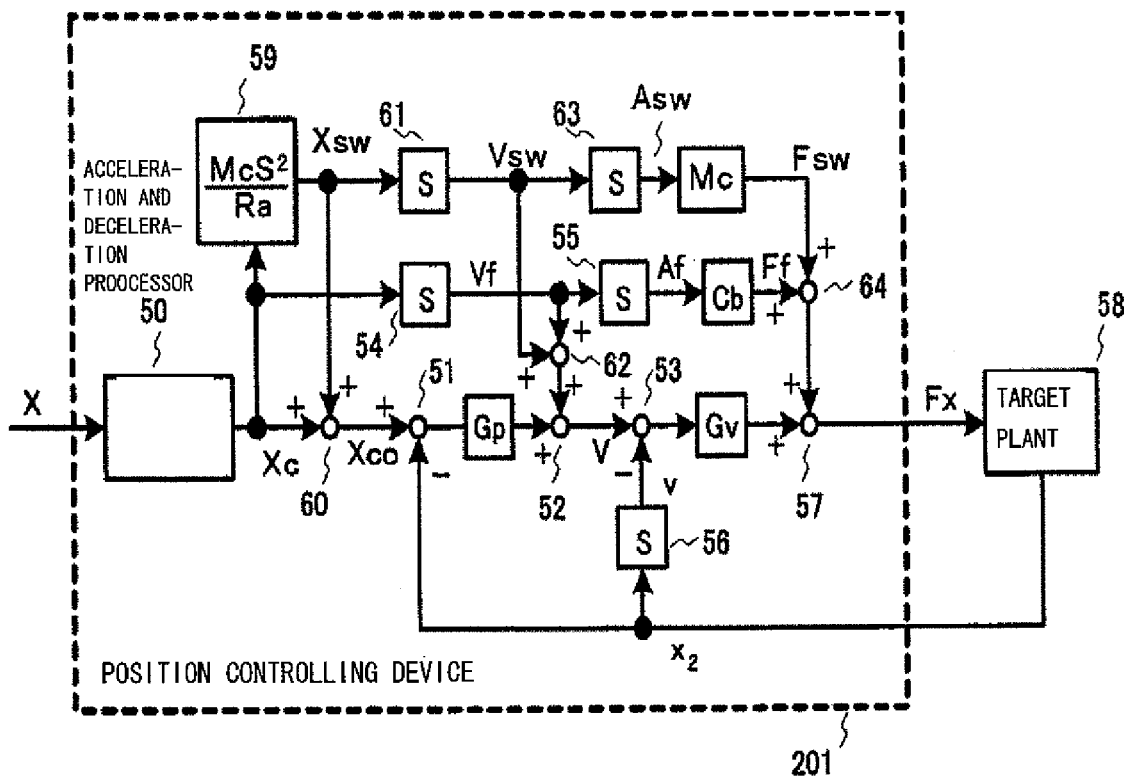
FIG. 15 is a block diagram showing a second example structure of a position controlling device of related art.
Figure 18:
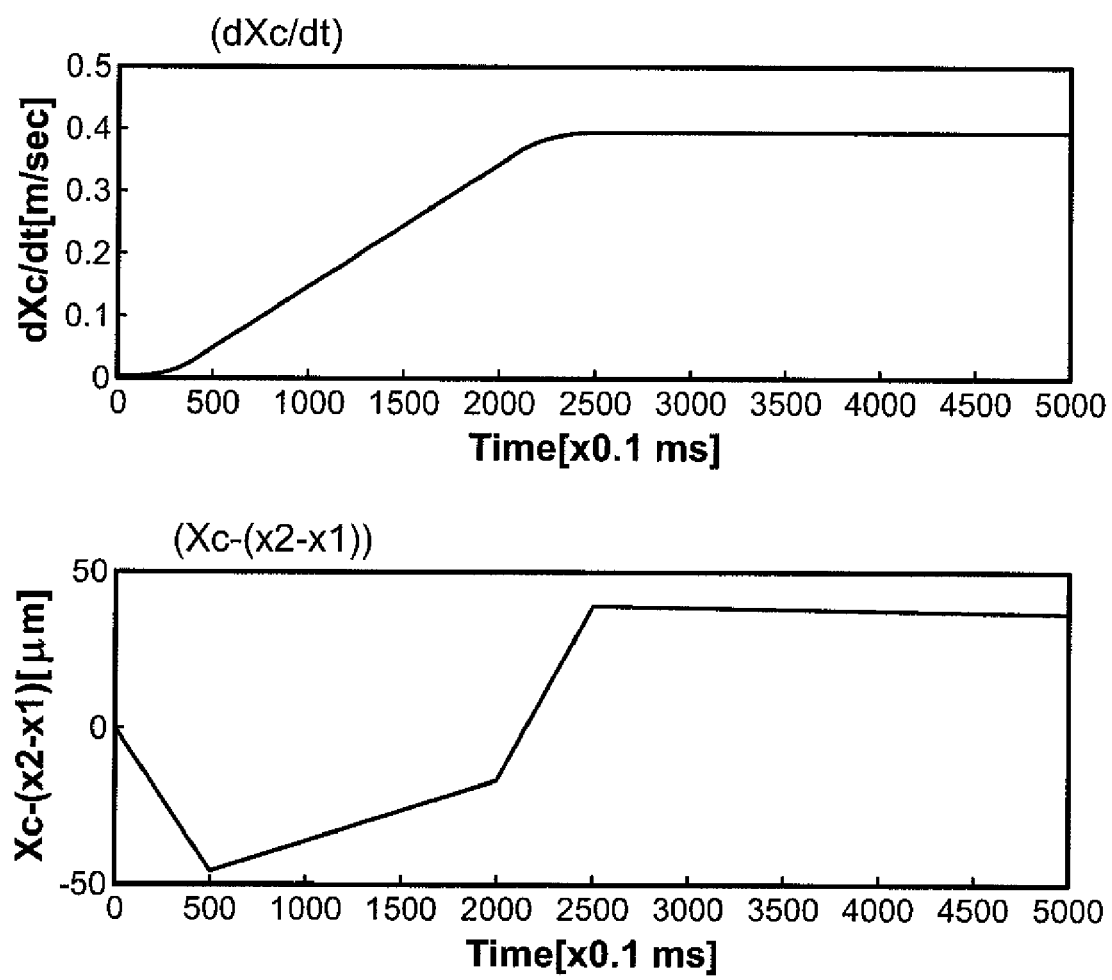
FIG. 18 is an explanatory diagram of an acceleration response of a target plant provided by a position controlling device as illustrated in FIG. 17.

FIG. 2 shows a result of a simulation of a second-order functional acceleration response when a parameter $\beta=4$ is set to the position controlling device of the present embodiment shown in FIG. 1 and target plant parameters and control parameters similar to FIG. 14 are given. For the second-order functional acceleration process, conditions similar to the second-order functional acceleration process of FIGS. 14, 16, and 18 which are already described are chosen. When the expression $S^2+\beta S+(Ra/Mb)$ is correlated to a standard expression of second order system, $S^2+2\zeta \omega nS+\omega n^2$, $\beta=4$ corresponds to an attenuation rate $\zeta=0.01$. As a result, the position controlling device of the present embodiment can inhibit the amount of generation of the error $\epsilon o$ of the absolute position and vibration during a shaft operation including acceleration and deceleration to very small values.

As described, according to the position controlling device of the present embodiment, by having a thrust feed forward structure which controls the structure to be driven according to a position instruction value for control and a position deviation compensation structure which simultaneously and precisely compensates a position instruction deviation caused by introduction of the thrust feed forward structure and a position deviation caused by the base displacement, it is possible to inhibit occurrence of vibration and to cause the absolute position ($x_2-x_1$) of the structure to be driven of the target plant to highly precisely follow the position instruction value Xc, during shaft operations including acceleration and deceleration. In addition, because the control amount is preferably varied according to the sizes of the acceleration instruction value Ac and acceleration derivative instruction value Bc, it is possible to achieve a high control advantage regardless of the size of these parameters.

Figure 11:
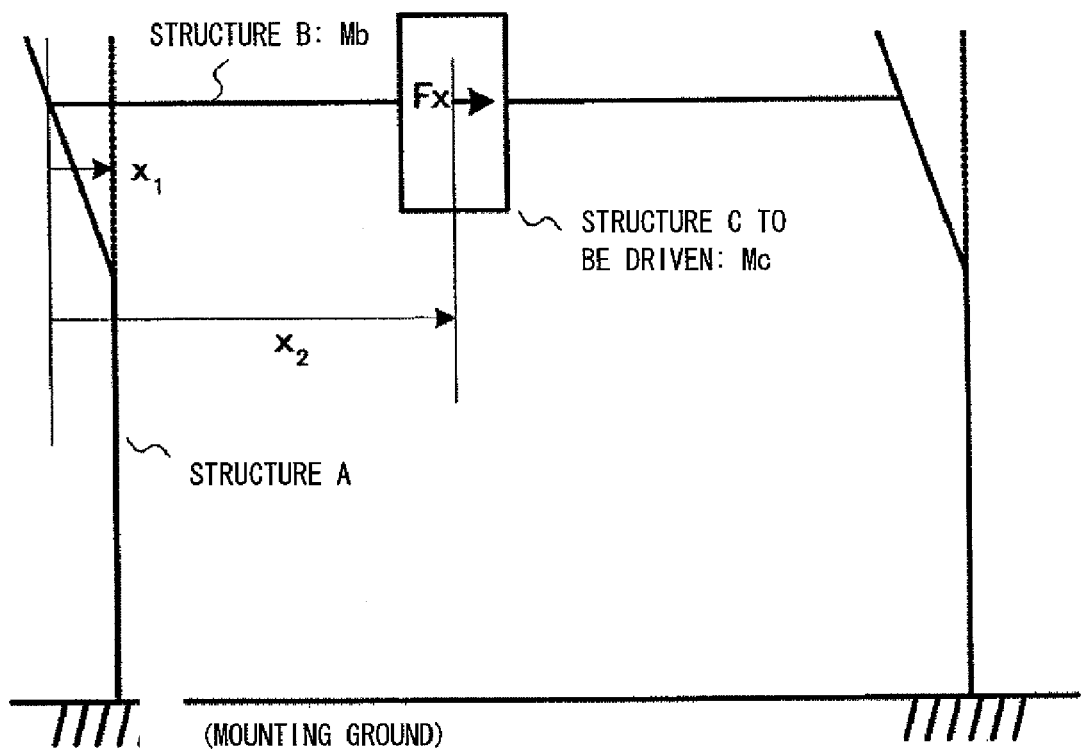
FIG. 11 is a schematic mechanism diagram of a target plant.

Next, an example will be described in which the position controlling device according to the present invention is applied to a control shaft targeted to controlling a position of a structure C to be driven on a structure B in FIG. 11. In this case, the parameter to be controlled according to the position instruction value Xc is the position $x_2$ of the structure to be driven of the target plant. Here, the restrictions for achieving the vibration inhibition are restrictions (a) and (b) which are already described, and a restriction for achieving the position deviation compensation is, based on $Xc^*-x_2=(\{Go-(Mb+Mc)S^2-Ra\}/Go)Xc^*$:

$$Xc - x_2 = \{Xc - Xc^*\} + \{Xc^* - x_2\} \quad (18)$$
$$= \alpha(Xc) + (\{Go - (Mb+Mc)S^2 - Ra\}/Go)Xc^*$$
$$= \alpha(Xc) + (\{Go - (Mb+Mc)S^2 - Ra\}/Go)\{Xc - \alpha(Xc)\}$$
$$= 0$$

Equation 18 can be solved for $\alpha(Xc)$ to obtain a restriction:
(Restriction d): Position deviation compensation amount $\alpha(Xc)$ satisfies Equation 19)

$$\alpha(Xc)=[\{(Mb+Mc)S^2+Ra-Go\}/\{(Mb+Mc)S^2+Ra\}]Xc \quad (19)$$

Similar to the first preferred embodiment, with regard to the restriction (d), the following Equation 20 is utilized to determine Go(s) and $\alpha(Xc)$ through an approximation form.

$$Go(s)=Ra,$$
$$\alpha(Xc)=[S^2/(S^2+\beta S+\{Ra/(Mb+Mc)\})]Xc \quad (20)$$

M and $P_2^{-1}M$ can be represented by the following Equation 21, based on Equations 12 and 13.

$$Xc^*=Xc-[S^2/(S^2+\beta S+\{Ra/(Mb+Mc)\})]Xc \quad (21)$$

Figure 3:
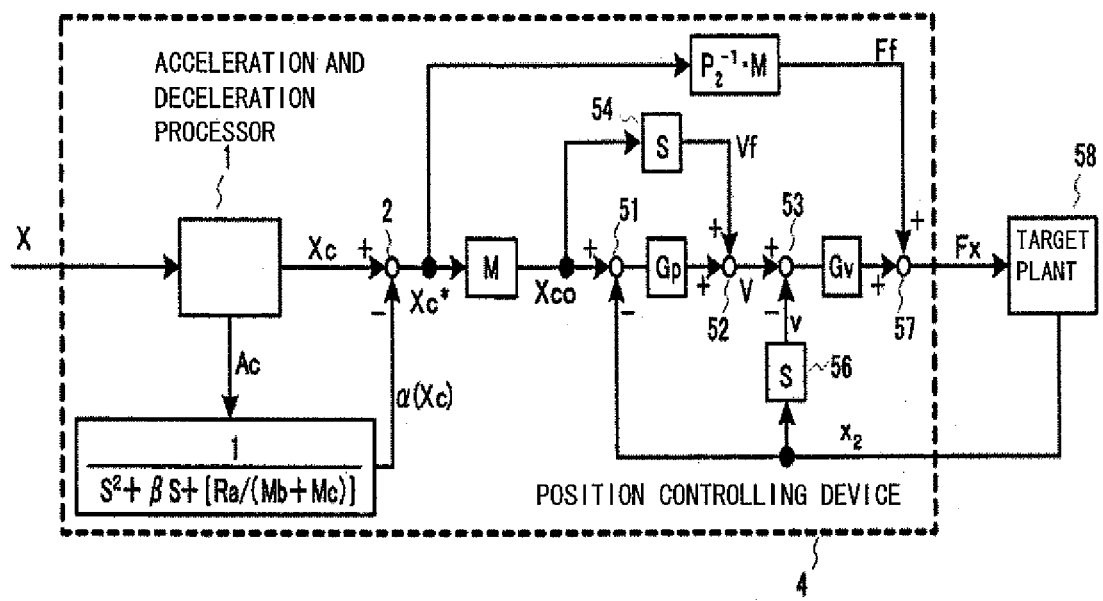
FIG. 3 is a block diagram showing a structure of a second preferred embodiment of a position controlling device according to the present invention.

FIG. 3 is a block diagram of a position controlling device according to the present embodiment. The structure is similar to the structure of the first preferred embodiment shown in FIG. 1 except that the position instruction value Xc* after compensation is determined by Equation 21. The actual calculations of various parameters are given by Equations 22, 23, and 24.

$$Ff = P_2^{-1}M \cdot Xc^* \quad (22)$$
$$= (\{McS^2(MbS^2+Ra)\}/Ra)(Xc-[S^2/\{S^2+\beta S+Ra/(Mb+Mc)\}]Xc)$$
$$= McAc + \{(MbMc\beta S^2 - \{Mc^2Ra/(Mb+Mc)\}S)/(Ra\{S^2+\beta S+Ra/(Mb+Mc)\})\}Bc$$

$$Xco = M \cdot Xc^* \quad (23)$$
$$= (\{(Mb+Mc)S^2+Ra\}/Ra)\{Xc-(S^2/\{S^2+\beta S+Ra/(Mb+Mc)\})Xc\}$$
$$= Xc + \{(Mb+Mc)\beta S/(Ra\{S^2+\beta S+Ra/\{Mb+Mc\}\})\}Ac$$

$$Vf = dXco/dt \quad (24)$$
$$Vc + \{(Mb+Mc) + \beta S/(Ra\{S^2+\beta S+Ra/(Mb+Mc)\})\}Bc$$

Figure 4:
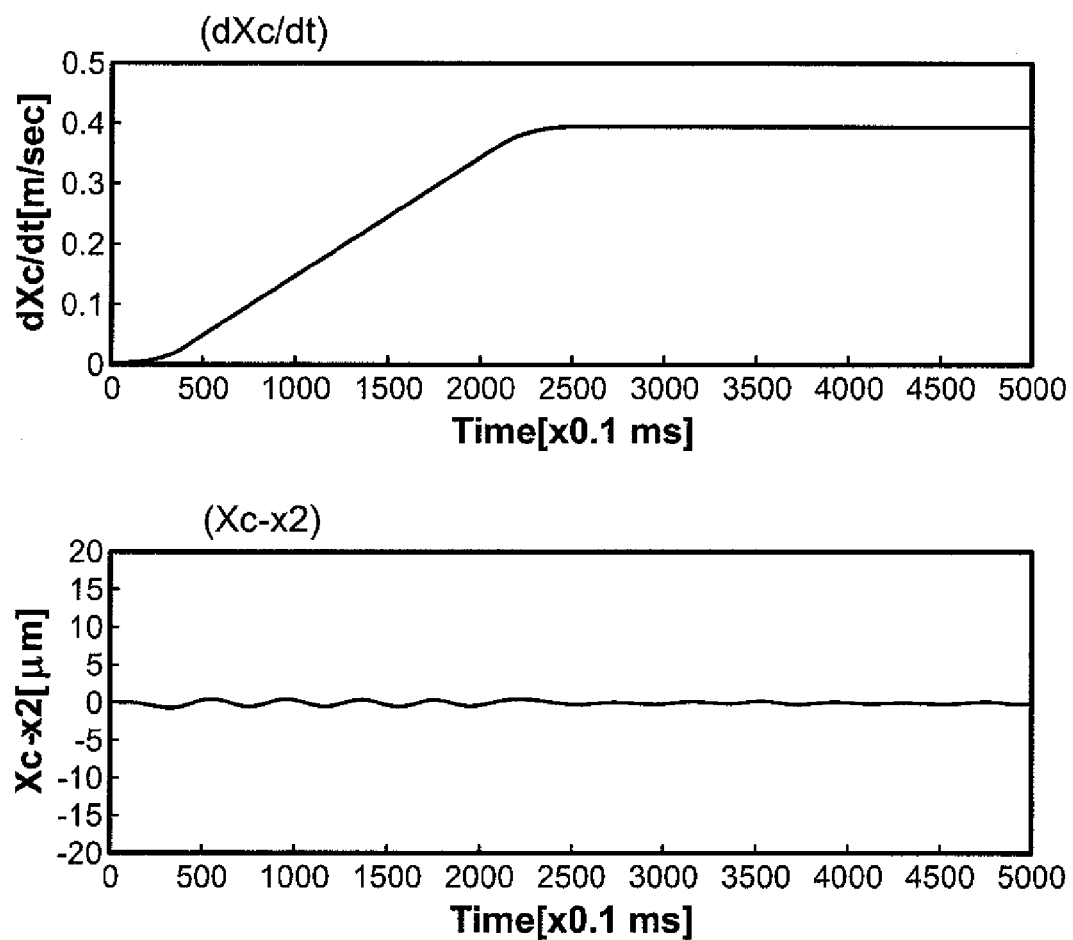
FIG. 4 is an explanatory diagram of an acceleration response of a target plant provided by a position controlling device as illustrated in FIG. 3.

FIG. 4 shows a result of a simulation of a second-order functional acceleration response when a parameter β corresponding to the attenuation rate ζ=0.01 is set similar to FIG. 2 in a position controlling device 4 according to the present embodiment shown in FIG. 3 and other conditions similar to FIG. 2 are applied. The result shows that the generation amount and vibration of the positional error $Xc-x^2$ during shaft operations including the acceleration and deceleration are inhibited to very small values, and it can be understood that the position controlling device of the present embodiment is effective when the position of the structure C to be driven on the structure B is controlled, similar to the control of the absolute position of the structure C to be driven.

A characteristic of the present embodiment is that, in order to cancel vibration in the responses of the position of the structure to be driven and the base displacement, a form is employed in which an acceleration and deceleration process function which has a small introduction impact is applied to the position instruction value after the normal acceleration and deceleration process to cancel vibration in various feed forward amounts and compensation amounts, to determine the position instruction value for control.

The present embodiment attempts to control the absolute position ($x_2-x_1$) of the structure to be driven of the target plant according to the position instruction value Xc. First, an acceleration and deceleration process function H(s) having the position instruction value Xc after the second-order functional acceleration and deceleration process as an input and the position instruction value Xco for control as an output is introduced, and control to achieve $Xco=x_2-x_1$ is considered. The impact of the introduction of the acceleration and deceleration process function H(s) will be described later.

Based on FIG. 12, the relationship between the driving force Fx and the absolute position ($x_2-x_1$) of the structure to be driven can be represented by the following Equation 25.

$$x_2-x_1=\{1/(McS^2)\}Fx \quad (25)$$

Therefore, the thrust feed forward amount Ff for controlling $Xco=(x_2-x_1)$ can be shown with Equation 26.

$$Ff=McS^2(x_2-x_1)=McS^2Xco=McS^2HXc \quad (26)$$

The responses of position $x_2$ of the structure to be driven and the base displacement $x_1$ are shown with Equations 27 and 28.

$$x_2=[\{(Mb+Mc)S^2+Ra\}/\{McS^2(MbS^2+Ra)\}]McHAc \quad (27)$$

$$x_1=\{1/(MbS^2+Ra)\}McHAc=McP_1HAc \quad (28)$$

Here, $P_1$ represents a transfer function from the driving force Fx to the base displacement $x_1$, and can be represented with Equation 29 based on FIG. 12.

$$P_1=1/(MbS^2+Ra) \quad (29)$$

As the corresponding feed forward structure, Equations 30 and 31 can be considered.

$$Xco^*=Xco+x_1=HXc+McS^2P_1HXc \quad (30)$$

$$Vf=dXco^*/dt=SHXc+McS^2P_1HSXc \quad (31)$$

The parameter Xco* is a position instruction value corresponding to the position $x_2$ of the structure to be driven.

Here, in order to cancel vibration in the responses of the position $x_2$ of the structure to be driven and the base displacement $x_1$, and reduce the impact of the introduction, an acceleration and deceleration process function H(s) is defined with Equation 32.

$$H(s)=(MbS^2+DS+Ra)/(MbS^2+\alpha S+Ra) \quad (32)$$

Here, $\alpha$ and D are arbitrary parameters of position real numbers. When $\alpha$ is set to reach 0 ($\alpha \to 0$), the introduction impact of H(s) is reduced, but the responses of the position of the structure to be driven and the base displacement become more vibrating. With regard to the parameter D, if there is a dumping component in the structure A, an approximation value is set.

Figure 5:
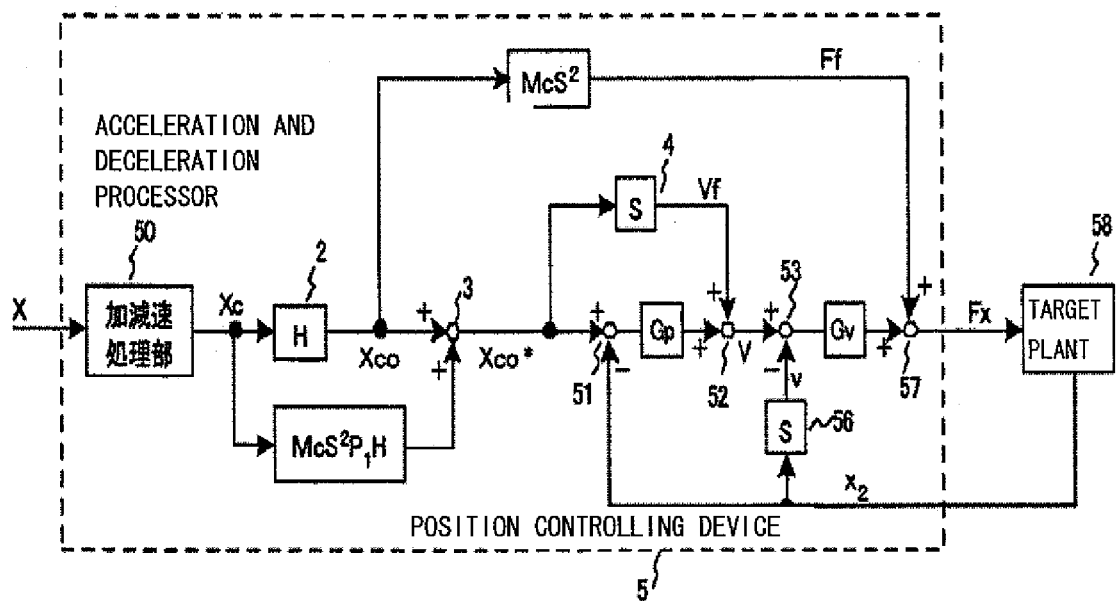
FIG. 5 is a block diagram showing a structure of a third preferred embodiment of a position controlling device according to the present invention.

FIG. 5 is a block diagram of a position controlling device 5 according to the present embodiment. Portions which differ from the position controlling devices of the related art which have been described will now be described. The position instruction value Xc which is the output of the acceleration and deceleration processor 50 is input to the acceleration and deceleration process function H(s) shown in Equation 32 and having a notch filter structure with a transfer pole of the target plant 58 as a notch angle frequency. The output of the acceleration and deceleration process function H(s) is the position instruction value Xco for control. An adder 3 adds a first term and a second term of the right side of the Equation 30 and outputs the position instruction value Xco* corresponding to the position $x_2$ of the structure to be driven. An adder 52 differentiates the position instruction value Xco* with a differentiator 4, and outputs the velocity feed forward amount Vf shown in Equation 31. Moreover, the position instruction value Xco for control is multiplied by $McS^2$ so that the thrust feed forward amount Ff shown in Equation 26 is calculated and input to an adder 57.

Figure 6:
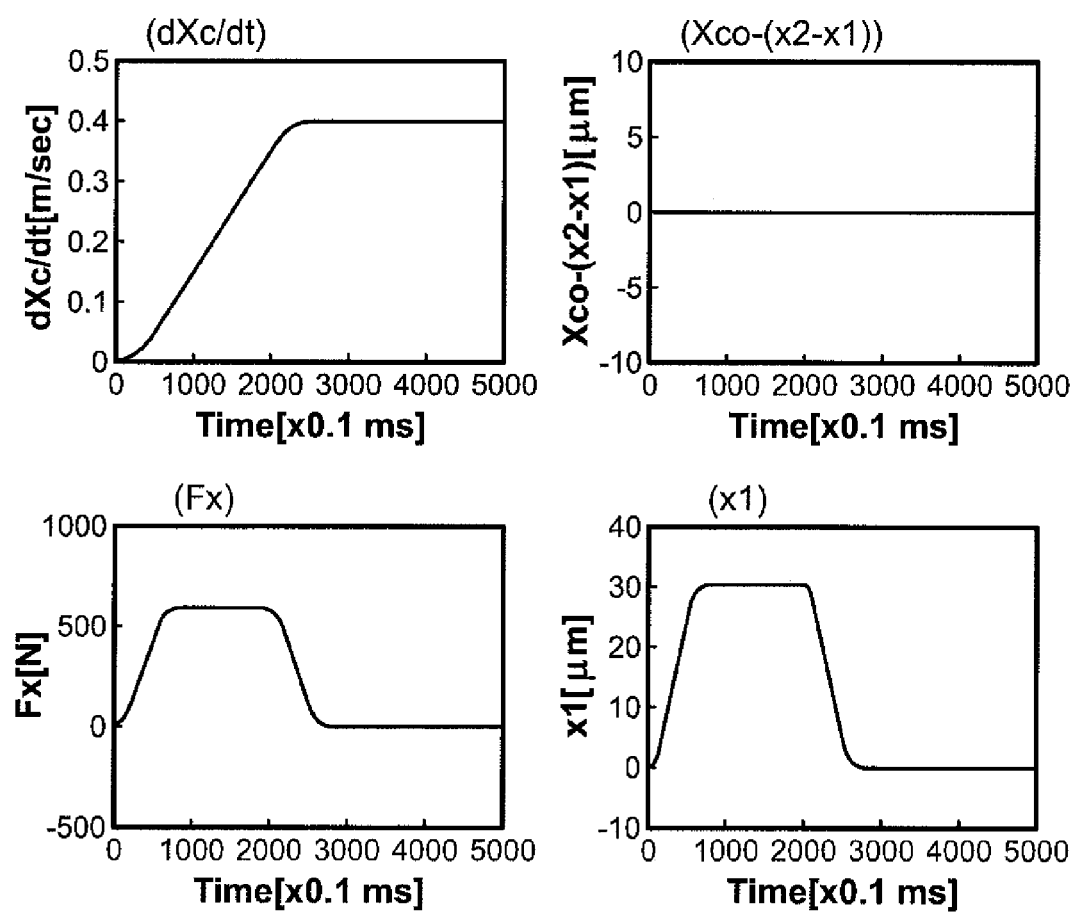
FIG. 6 is an explanatory diagram of an acceleration response of a target plant provided by a position controlling device as illustrated in FIG. 5.
Figure 16:
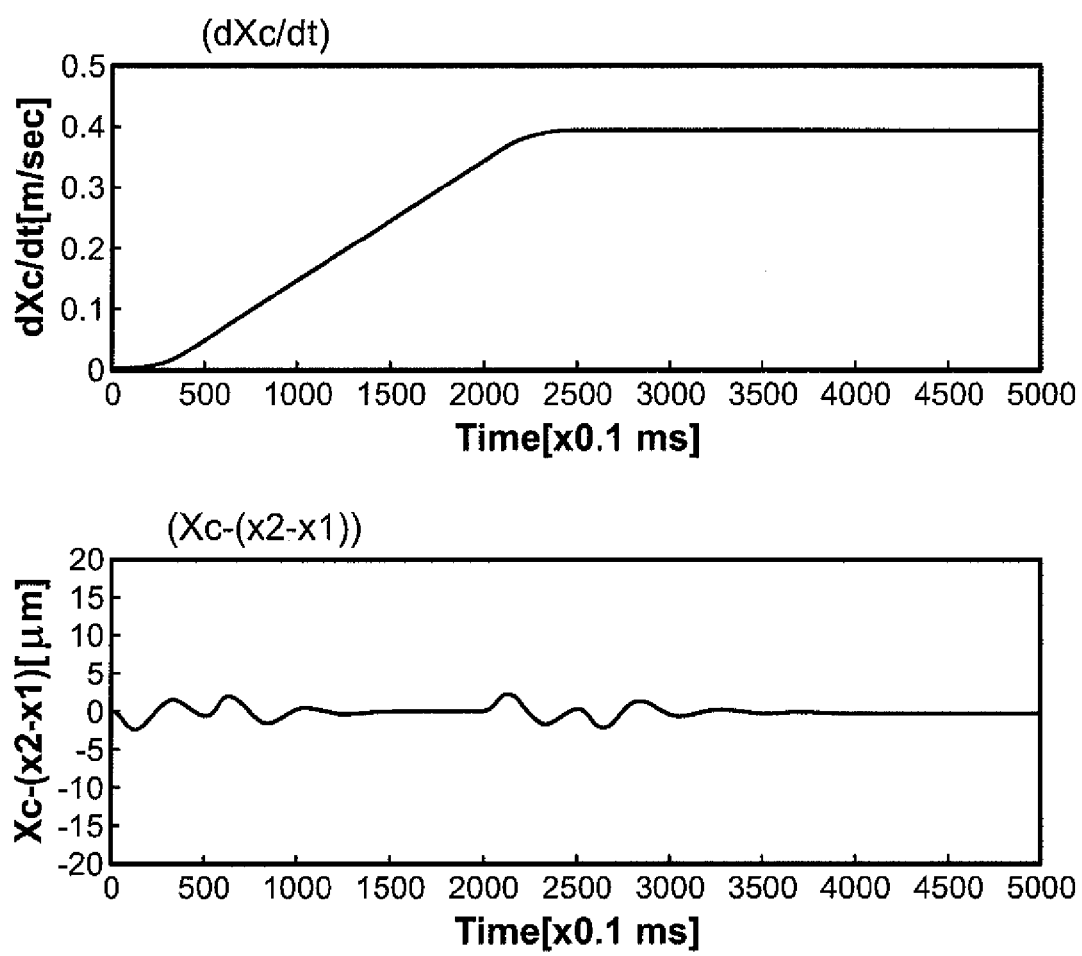
FIG. 16 is an explanatory diagram of an acceleration response of a target plant provided by a position controlling device as illustrated in FIG. 15.
Figure 17:
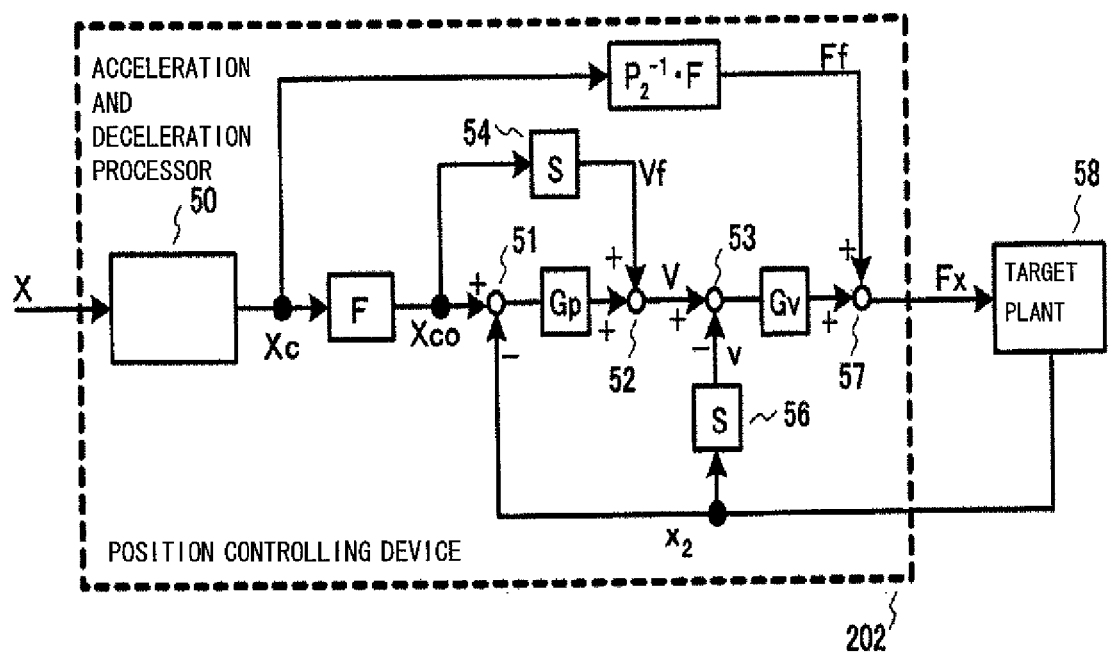
FIG. 17 is a block diagram showing a third example structure of a position controlling device of related art.

FIG. 6 shows a result of a simulation of a second-order functional acceleration response when a parameter $\alpha = 198 \cdot 10^3$ is set in the position controlling device of the present embodiment shown in FIG. 5 and target plant parameters, control parameters, and second-order functional acceleration conditions similar to FIG. 16 are given. When the polynomial expression in the denominator of H(s), $MbS^2+\alpha S+Ra$ is correlated to the standard expression of second order, $S^2+2\zeta\omega nS+\omega n^2$, $\alpha=198 \cdot 10^3$ corresponds to an attenuation rate $\zeta$ of 1 ($\zeta=1$). The result shows that, with the position controlling device of the present embodiment, the control to $Xco=x_2-x_1$ is achieved including the times of acceleration and deceleration (top right drawing in FIG. 6). Because a large value is assigned to the attenuation rate $\zeta$, vibrations in the thrust feed forward amount Ff and the velocity feed forward amount can be removed, and, thus, the vibrations in the driving force Fx (bottom left drawing in FIG. 6) and base displacement $x_1$ (bottom right drawing in FIG. 6) can be inhibited.

Figure 7:
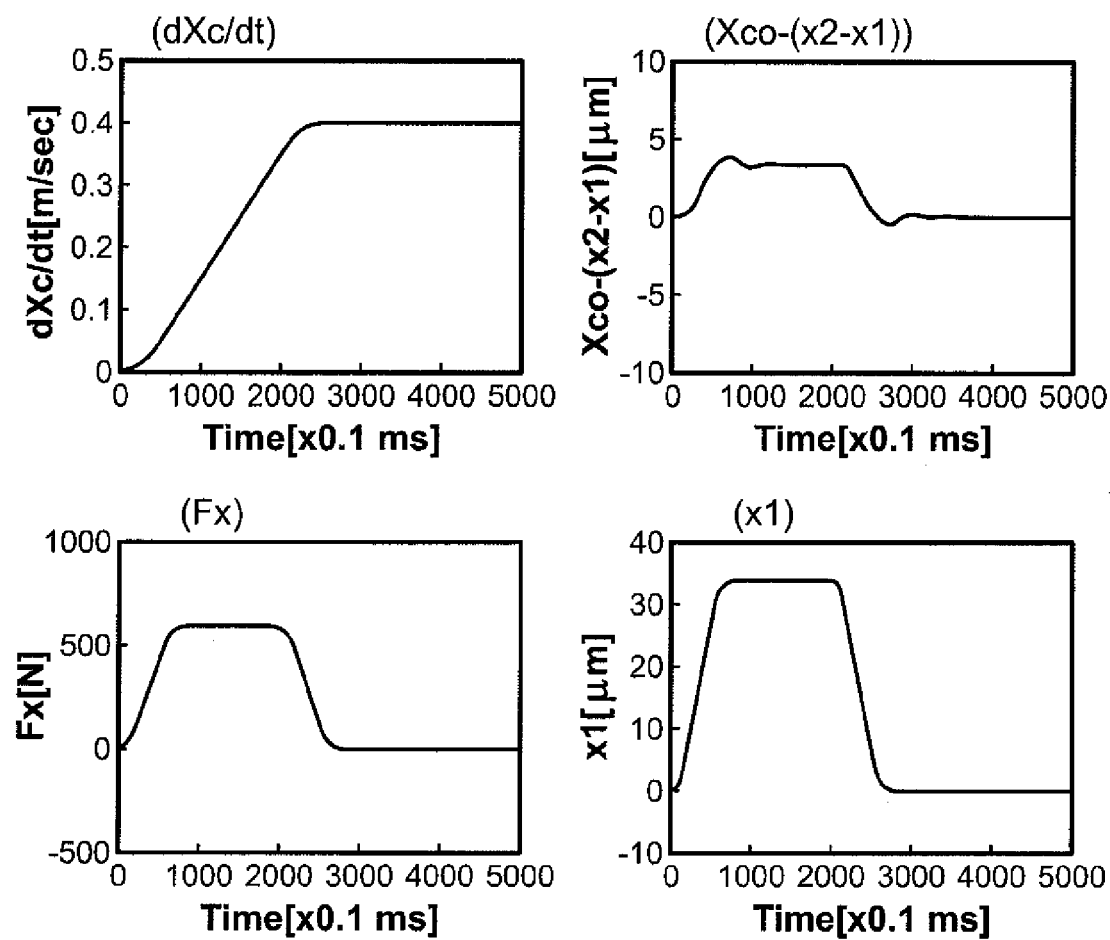
FIG. 7 is an explanatory diagram of an acceleration response of a target plant provided by a position controlling device as illustrated in FIG. 5 during a change in a device parameter.

FIG. 7 shows a result of a simulation of a second-order functional acceleration response when only the rigidity Ra of the structure A on the side of the target plant is reduced (−10%) compared to the conditions of FIG. 6. Because the rigidity Ra used in the calculation on the control side is identical to that of FIG. 6, this result simulates a response when the device parameter is changed. Due to the reduction of rigidity Ra, the base displacement $x_1$ is increased (bottom right drawing in FIG. 7), and the increase causes a control error during acceleration (top right drawing in FIG. 7). However, the vibration inhibition performance is sufficiently high compared to the example control structure of the related art of FIG. 16.

In another preferred embodiment, a position $x_2$ of the structure to be driven of the target plant is controlled according to the position instruction value Xc. In this case also, similar to the third preferred embodiment, first, an acceleration and deceleration process function Hr(s) having the position instruction value Xc after the second-order functional acceleration and deceleration process as an input and the position instruction value Xco for control as an output is introduced, and control to achieve $Xco=x_2$ is considered. The impact of the introduction of the acceleration and deceleration process function Hr(s) will be described later.

Based on FIG. 12, a relationship between the driving force Fx and the position $x_2$ of the structure to be driven can be represented with the following Equation 33.

$$x_2=P_2Fx=[\{(Mb+Mc)S^2+Ra\}/\{McS^2(MbS^2+Ra)\}]Fx \quad (33)$$

Thus, the thrust feed forward amount Ff for achieving control of $Xco=x_2$ is represented by the following Equation 34.

$$Ff=P_2^{-1}Xco=P_2^{-1}HrXc=[\{McS^2(MbS^2+Ra)\}/\{(Mb+Mc)S^2+Ra\}]HrXc \quad (34)$$

The responses of the position $x_2$ of the structure to be driven and the base displacement $x_1$ to the thrust feed forward amount Ff can be represented by the following Equations 35 and 36.

$$x_2=P_2Ff=Xco=HrXc \quad (35)$$

$$x_1=\{1/(MbS^2+Ra)\}Ff=[McS^2/\{(Mb+Mc)S^2+Ra\}]HrXc \quad (36)$$

Therefore, as a corresponding feed forward structure, the following Equations 37 and 38 are considered.

$$Xco=HrXc \quad (37)$$

$$Vf=dXco/dt=SHrXc \quad (38)$$

Here, in order to remove vibrations in the responses of the position $x_2$ of the structure to be driven and the base displacement $x_1$ and reduce the impact of introduction, the acceleration and deceleration process function Hr(s) is defined with the following Equation 39.

$$Hr(s)=\{(Mb+Mc)S^2+DS+Ra\}/\{(Mb+Mc)S^2+\gamma S+Ra\} \quad (39)$$

wherein $\gamma$ and D are arbitrary parameters of positive real number. When $\gamma$ is set to reach 0 ($\gamma \to 0$), the introduction impact of Hr(s) is reduced, but the responses of the position of the structure to be driven and the base displacement become more vibrating. With regard to the parameter D, when there is a dumping component in the structure A, an approximated value is set.

Figure 8:
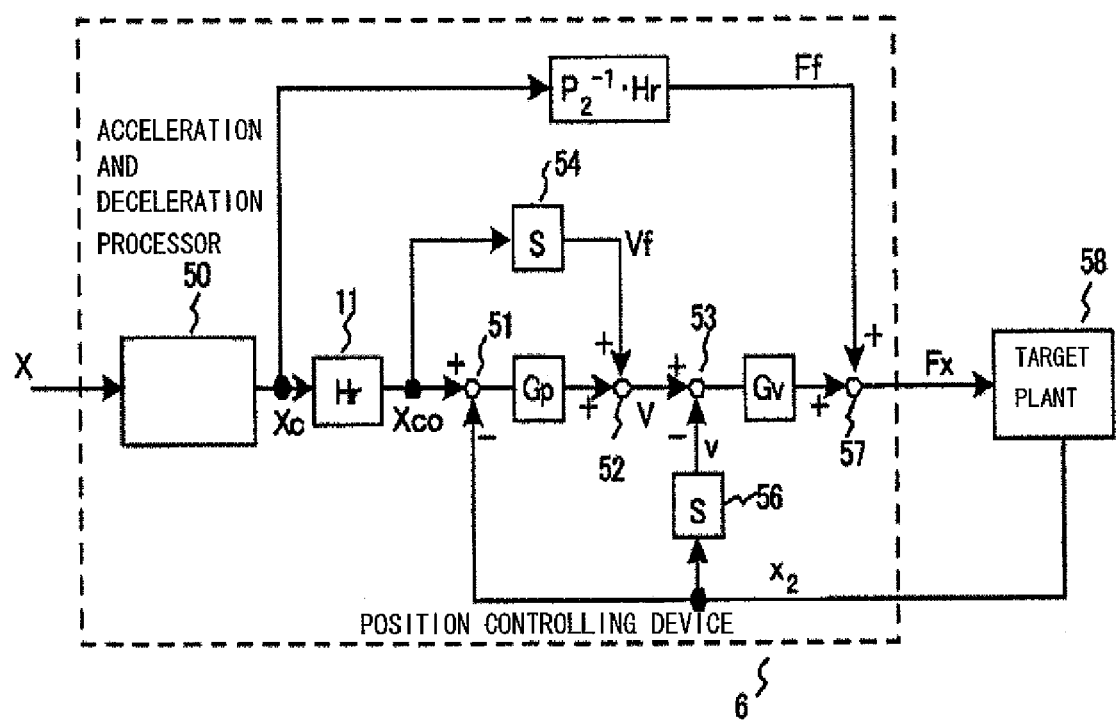
FIG. 8 is a block diagram showing a structure of a position controlling device of a fourth preferred embodiment according to the present invention.

FIG. 8 is a block diagram of a position controlling device 10 of the present embodiment. Portions which differ from the position controlling devices which have been described will now be described. The position instruction value Xc which is the output of the acceleration and deceleration processor 50 is input to the acceleration and deceleration process function Hr(s) shown in the Equation 39 and having a notch filter structure with a transfer zero point from the driving force Fx to the position $x_2$ of the structure to be driven of the target plant 59 as a notch angle frequency. The output of the acceleration and deceleration process function Hr(s) is the position instruction value Xco for control. The velocity feed forward amount Vf shown in Equation 38 is determined by differentiating the position instruction value Xco with a differentiator 54. Moreover, the thrust feed forward amount Ff shown in Equation 35 can be determined by multiplying Xc by $P_2^{-1}Hr$, because $P_2^{-1}Hr$ is made a stable bounded function.

Figure 9:
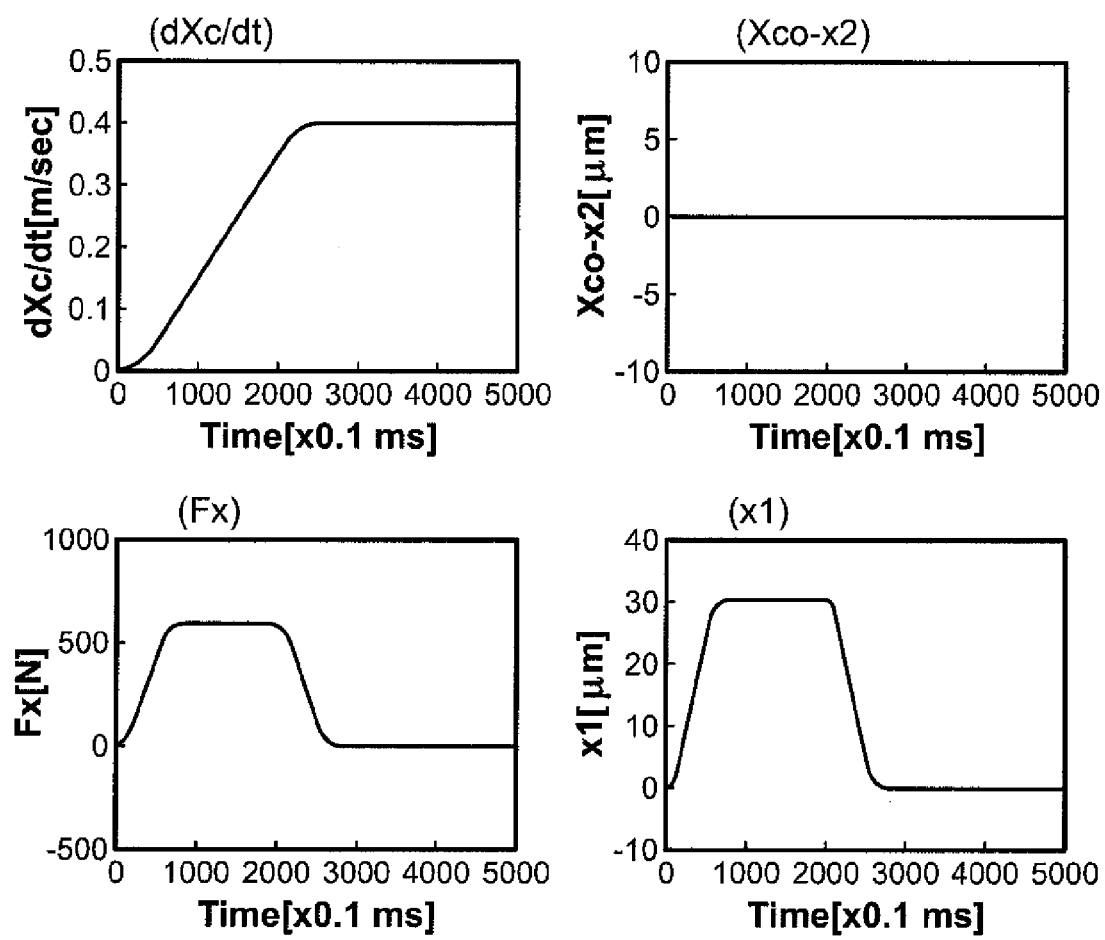
FIG. 9 is an explanatory diagram of an acceleration response of a target plant provided by a position controlling device as illustrated in FIG. 8.

When the polynomial expression $(Mb+Mc)S^2+\gamma S+Ra$ in the denominator of Hr(s) is correlated to a standard second-order expression, $S^2+2\zeta\omega nS+\omega n^2$, $\gamma=250\cdot 10^3$ corresponds to an attenuation rate $\zeta$ of 1. FIG. 9 shows a result of a simulation of a second-order functional acceleration response when a parameter $\gamma=250\cdot 10^3$ is set in the position controlling device of the present embodiment shown in FIG. 8, and target plant parameters, control parameters, and second-order functional acceleration conditions identical to FIG. 6 are given. According to the position controlling device of the present embodiment, the control of $Xco=x_2$ is achieved even during acceleration and deceleration (top right drawing of FIG. 9). Because a large attenuation $\zeta$ is set, vibrations in the thrust feed forward amount Ff and velocity feed forward amount Vf can be removed, and, thus, the vibratios in the driving force Fx (bottom left drawing in FIG. 9) and the base displacement $x_1$ (bottom right drawing in FIG. 9) can be inhibited similarly as in the first preferred embodiment.

Figure 10:
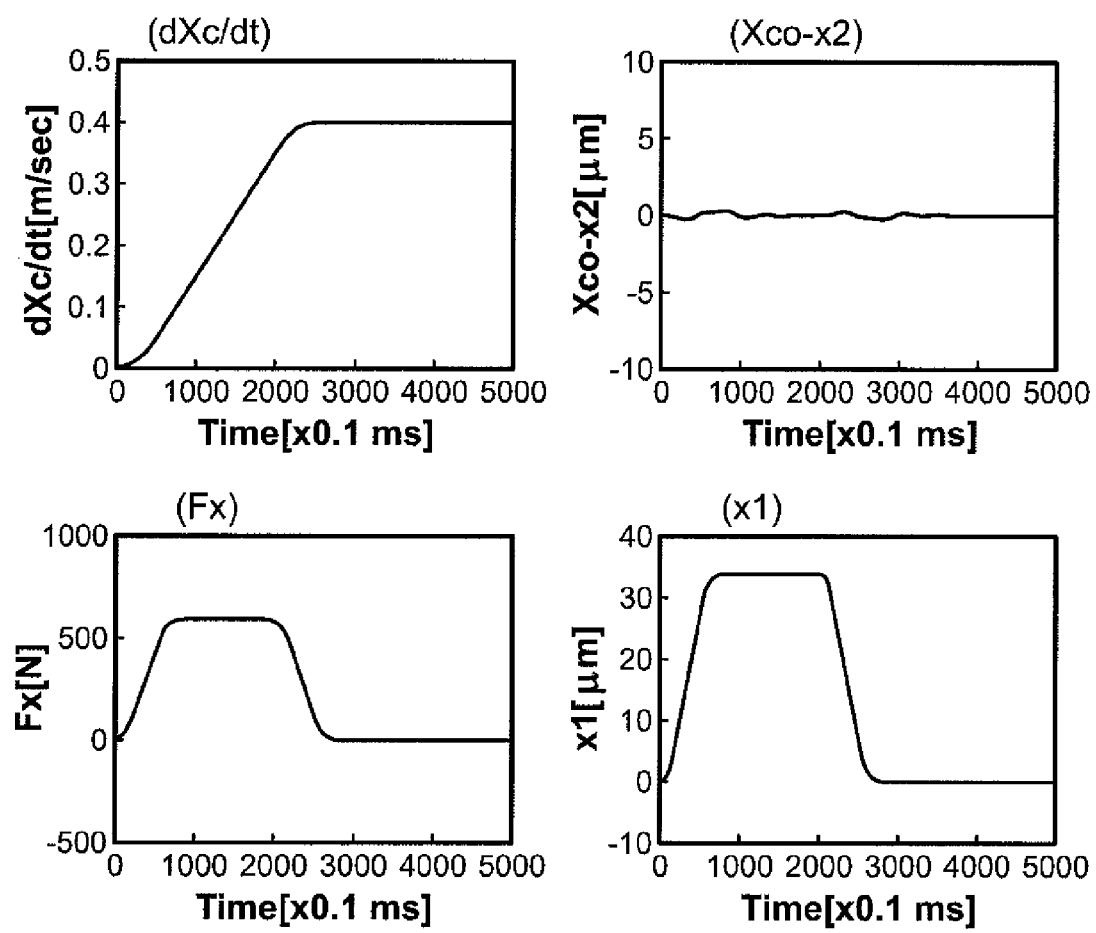
FIG. 10 is an explanatory diagram of an acceleration response of a target plant provided by a position controlling device as illustrated in FIG. 8 during a change in a device parameter.

FIG. 10 shows a result of a simulation of a second-order functional acceleration response when only the rigidity Ra of the structure A on the side of the target plant is reduced (−10%) compared to the conditions of FIG. 9, similar to the conditions of FIG. 7 compared to FIG. 6. Because the rigidity Ra used in the calculation at the control side is identical to FIG. 9, this result simulates a response when the device parameter is changed. Because of the reduction of the rigidity Ra, the base displacement $x_1$ is increased (bottom right drawing of FIG. 10). However, the control error defined by $(Xco-x_2)$ (top right drawing in FIG. 10) is not directly affected, and a high vibration inhibition performance is maintained similarly as in the third preferred embodiment.

The impact of introduction of the acceleration and deceleration process function H(s) shown in Equation 32 will now be described. Because H(s) has a construction common with the acceleration and deceleration process function Hr(s) shown in Equation 39, in the following description, normalized F(s) of the following Equation 40 will be considered.

$$F(s)=(S^2+c)/(S^2+bS+c)=(S^2+\omega n^2)/(S^2+2\zeta\omega nS+\omega n^2) \quad (40)$$

The introduction impact will be considered in comparison to a linear acceleration and deceleration process $L(s)=(1-e^{-TS})/TS$ (wherein T is a time constant in the linear acceleration and deceleration process) which is a typical position acceleration and deceleration process.

A direct impact of the acceleration and deceleration process on the position instruction is that a delay is caused between the position instruction X before the acceleration and deceleration process and the position instruction Xo after the acceleration and deceleration process. Thus, a delay $\epsilon p=X-Xo$ of the position instruction at a steady state with respect to a step velocity instruction $dX/dt=V$ is considered. In the case of the linear acceleration and deceleration process, $$\epsilon p=(T/2)V \quad (41)$$

On the other hand, the delay $\epsilon p$ in the acceleration and deceleration process function F(s) of the embodiments of the present invention is:

$$\epsilon p(s)=(V/S^2)-\{(S^2+c)/(S^2+bS+c)\}(V/S^2)=\{bS/(S^2+bS+c)\}(V/S^2) \quad (42)$$

Using the final value theorem and a relationship of Equation 40, $\epsilon p$ can be represented by the following Equation 43.

$$\epsilon p=(b/c)V=(2\zeta/\omega n)V \quad (43)$$

It is known that, when a plurality of shafts are synchronously operated, a trajectory error is caused by the acceleration and deceleration process. Thus, a response radius Ro after acceleration and deceleration process in the steady state is considered with respect to an arc position instruction (radius R and angular velocity $\omega$) by synchronous operation of two orthogonal shafts, and the trajectory error due to the acceleration and deceleration process is evaluated with an arc radius reduction amount $\Delta R=R-Ro$. Because the response radius Ro is equal to the steady-state amplitude of Xo(t) with respect to $X(t)=R\cos\omega t$, in the linear acceleration and deceleration process, Xo(s):

$$Xo(s)=\{(1-e^{-TS})/TS\}\{Rs/(S^2+\omega^2)\} \quad (44)$$

can be inverse Laplace transformed, and, because $\omega T$ is much less than 1, that is $\omega T \ll 1$, in general operation, the response radius Ro can be represented by the following Equation 45.

$$Ro = (R/\omega T)(2-2\cos\omega T)^{1/2} \approx (R/\omega T)\{\omega T - (\omega T)^3/24\} \quad (45)$$
$$= R - R(\omega T)^2/24$$

The arc radius reduction amount $\Delta R$ can be approximated with the following Equation 46.

$$\Delta R=R-Ro=\{(\omega T)^2/24\}R \quad (46)$$

In the case of the acceleration and deceleration process function F(s) of the embodiments of the present invention, $$Xo(s)=\{(S^2+c)/(S^2+bS+c)\}\{RS/(S^2+\omega^2)\} \quad (47)$$

is inverse Laplace transformed, and the response radius Ro is:

$$Ro=R(c-\omega^2)/\{(b\omega)^2+(c-\omega^2)^2\}^{1/2}=R\cos\theta \quad (48)$$

Thus, the arc radius reduction amount $\Delta R$ is shown by the following Equation 49.

$$\Delta R=R-Ro=(1-\cos\theta)R \quad (49)$$

Here, $\theta=\tan^{-1}\{b\omega/(c-\omega^2)\}=\tan^{-1}\{2\zeta\omega n\omega/(\omega n^2-\omega^2)\}$.

When T=200 ms, $\omega n$=200 rad/sec, V=0.4 m/sec, and $\zeta$=1 are selected as conditions similar to the conditions employed in the above-described simulations, the delay $\epsilon p$ in the position instruction is 40 mm in the linear acceleration and deceleration process ($\epsilon p$=40 mm) and is 4 mm in the acceleration and deceleration process function F(s) of the embodiments of the present invention ($\epsilon p$=4 mm). When, on the other hand, R=0.1 m and $\omega$=2 rad/sec are chosen as arc operation conditions, the arc radius reduction amount $\Delta R$ is approximately 670 μm in the linear acceleration and deceleration process ($\Delta R \approx 670$ μm) and is approximately 20 μm in the acceleration and deceleration process function F(s) of the embodiments of the present invention ($\Delta R \approx 20$ μm). In other words, the delay in the position instruction and the trajectory error which are caused by introduction of the acceleration and deceleration process function H(s) or Hr(s) of the embodiments of the present invention are sufficiently small compared to the delay in the position instruction and the trajectory error caused in the acceleration and deceleration processor which is already present, and it can thus be understood that the impact due to the introduction is small.

As described, a position controlling device of the embodiments of the present invention has a feed forward structure for thrust and velocity for controlling the structure to be driven according to the position instruction value for control and, at the same time, calculates the position instruction value for control by adding the acceleration and deceleration process to the position instruction value with a notch filter structure having a small introduction impact. With this structure, vibration in various feed forward amounts can be cancelled, and the responses of the position of the structure to be driven and the base displacement can be controlled precisely and without vibration. Because the control amount is preferably varied according to the sizes of the acceleration instruction value Ac ($=d^2Xc/dt^2$) and the acceleration derivative instruction value Bc ($=d^3Xc/dt^3$), a high control advantage can be obtained regardless of the sizes of the parameters Ac and Bc. In addition, because vibration in the responses of the position of the structure to be driven and the base displacement is cancelled, no vibration is induced in various parts of the device, and an advantageously high degree of vibration inhibition can be maintained even when the device parameters are changed.

What is claimed is:

1. A position controlling device comprising:

a driving system which applies acceleration and deceleration operations to a structure to be driven supported by and fixed on a base, wherein the position controlling device applies compensation for force displacement caused in the base by a reaction force of the structure to be driven, wherein the position controlling device controls an absolute position of the structure to be driven by detecting a position of the structure to be driven which is driven by a servo motor, wherein the position controlling device calculates a position instruction value for control according to a position instruction value from an upper device, wherein the position controlling device calculates a driving force of the servo motor based on the calculated position instruction value for control;

an acceleration and deceleration processor which receives as an input the position instruction value and outputs:

a position instruction value after acceleration and deceleration process which is obtained by applying an acceleration and deceleration process to the position instruction value, wherein a third-order time derivative is bounded, and an acceleration instruction value which is a time derivative of the obtained position instruction value after acceleration and deceleration process;

a position instruction value output portion which calculates and outputs the position instruction value for control by multiplying a position instruction value after compensation based on the position instruction value after acceleration and deceleration process by an adjustment transfer function;

a thrust feed forward amount calculating portion which calculates a thrust feed forward amount for inhibiting a vibration based on the adjustment transfer function and the position instruction value after compensation based on the position instruction value after acceleration and deceleration process, and adds the obtained thrust feed forward amount to a driving force of the servo motor;

a position deviation compensation amount calculating portion which calculates a position deviation compensation amount based on the acceleration instruction value output from the acceleration and deceleration processor, a rigidity of the base, and a mass of the driving system, the position deviation compensation amount to be used to compensate a position instruction deviation and a base displacement with the adjustment transfer function; and a subtractor which subtracts the position deviation compensation amount from the position instruction value after acceleration and deceleration process, to calculate the position instruction value after compensation, wherein the position instruction value after compensation is calculated by subtracting, from the position instruction value after acceleration and deceleration process, the position deviation compensation amount which is used to compensate the position instruction deviation and the base displacement with the adjustment transfer function, wherein the position instruction value for control is calculated and output by multiplying the calculated position instruction value after compensation by the adjustment transfer function, and wherein a thrust feed forward amount for inhibiting a vibration is calculated from the position instruction value after compensation and the adjustment transfer function.

2. The position controlling device according to claim 1, wherein the position deviation compensation amount calculating portion calculates the position deviation compensation amount which is used to compensate the position instruction deviation ith the adjustment transfer function from the acceleration instruction value, the rigidity of the base, and the mass of the driving system, and a mass of the structure to be driven.

3. A position controlling device comprising:

a driving system which applies acceleration and deceleration operations to a structure to be driven is supported by and fixed on a base, wherein compensation for force displacement caused in the base by a reaction force of the structure to be driven is provided, wherein the position controlling device controls an absolute position of the structure to be driven by detecting a position of the structure to be driven which is driven by a servo motor, calculating a position instruction value for control according to a position instruction value from an upper device, and calculating a driving force of the servo motor based on the calculated position instruction value for control;

an acceleration and deceleration processor which receives as an input the position instruction value and outputs a position instruction value after acceleration and deceleration process which is obtained by applying an acceleration and deceleration process to the position instruction value wherein a second-order time derivative is bounded;

a filter processor that has an acceleration and deceleration process function which has a notch filter structure representing, as a transfer function based on the rigidity of the base and the mass of the driving system, a relationship between the driving force which is output by the servo motor and a driving position obtained by the driving force and having a transfer pole of the transfer function as a notch angle frequency, and applies a filtering process to and outputs, as the position instruction value for control, the position instruction value after acceleration and deceleration process which is output from the acceleration and deceleration processor;

a thrust feed forward amount calculating portion which calculates the thrust feed forward amount which controls the position instruction value for control to the absolute position of the structure to be driven based on the position instruction value for control and a mass of the structure to be driven, and adds the calculated thrust feed forward amount to a driving force of the servo motor;

a modified position instruction value calculating portion which calculates a modified position instruction value for control corresponding to the position of the structure to be driven by calculating a base displacement based on the position instruction value after acceleration and deceleration process, the mass of the structure to be driven, the acceleration and deceleration process function of the notch filter structure, and the transfer function, and adding the base displacement to the position instruction value for control, wherein the modified position instruction for control is calculated and output by adding the position instruction value for control obtained by applying a filter process to the position instruction value after acceleration deceleration process with the acceleration and deceleration process function of the notch filter structure and the base displacement calculated based on the acceleration and deceleration process function of the notch filter structure, and wherein the thrust feed forward amount is calculated based on the position instruction value for control and the mass of the structure to be driven to control the position instruction value for control to the absolute position of the structure to be driven.

4. The position controlling device according to claim 3, wherein an acceleration and deceleration process function of the filter processor has a notch filter structure representing, as the transfer function, a relationship between the driving force which is output by the servo motor and the driving position obtained by the driving force and applying a zero point of the transfer function as a notch angle frequency, and based on the position instruction value after acceleration and deceleration process, the acceleration and deceleration process function, and the transfer function, the thrust feed forward calculating portion calculates the thrust feed forward amount which is used to control the position instruction value for control to the position of the structure to be driven, adds the obtained thrust feed forward amount to the driving force of the servo motor by outputting the position instruction value for control obtained by applying a filter process to the position instruction value after acceleration deceleration process using the acceleration and deceleration process function of the notch filter structure, and calculates the thrust feed forward amount for controlling the position instruction value for control obtained based on the position instruction value after acceleration and deceleration process, the acceleration and deceleration process function, and the transfer function to the position of the structure to be driven.

* * * * *